(12) United States Patent
Kim et al.

(10) Patent No.: US 7,271,856 B2
(45) Date of Patent: Sep. 18, 2007

(54) LIQUID CRYSTAL DISPLAY AND METHOD FOR FABRICATING THE SAME

(75) Inventors: Kwang Min Kim, Taejeon-kwangyokshi (KR); Dong Yeung Kwak, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/329,411

(22) Filed: Dec. 27, 2002

(65) Prior Publication Data
US 2003/0122988 A1  Jul. 3, 2003

(30) Foreign Application Priority Data
Dec. 28, 2001  (KR) ............ 10-2001-87156

(51) Int. Cl.
G02F 1/136 (2006.01)
G02F 1/1343 (2006.01)
B44F 1/10 (2006.01)

(52) U.S. Cl. ............... 349/43; 349/38; 349/39; 428/30

(58) Field of Classification Search .......... 349/43, 349/143, 110, 123, 38, 39, 42, 139, 44, 46; 438/30; 428/30
See application file for complete search history.

(56) References Cited

U.S. PATENT DOCUMENTS

| | | | | |
|---|---|---|---|---|
| 5,771,083 A | * | 6/1998 | Fujihara et al. | 349/147 |
| 5,940,056 A | * | 8/1999 | Hanazawa et al. | 345/87 |
| 5,995,178 A | * | 11/1999 | Fujikawa et al. | 349/55 |
| 6,057,896 A | * | 5/2000 | Rho et al. | 349/42 |
| 6,147,722 A | * | 11/2000 | Shimada et al. | 349/43 |
| 6,262,784 B1 | * | 7/2001 | Kim | 349/43 |
| 6,300,152 B1 | * | 10/2001 | Kim | 438/30 |
| 6,307,602 B1 | * | 10/2001 | Song | 349/38 |
| 6,326,641 B1 | * | 12/2001 | Choi | 257/57 |
| 6,337,731 B1 | * | 1/2002 | Takemura | 349/187 |
| 6,356,318 B1 | * | 3/2002 | Kawahata | 349/38 |
| 6,424,326 B2 | * | 7/2002 | Yamazaki et al. | 345/77 |
| 6,449,025 B2 | * | 9/2002 | Lee | 349/129 |

FOREIGN PATENT DOCUMENTS

| | | |
|---|---|---|
| KR | 1999-74557 | 10/1999 |
| KR | 2000-60596 | 10/2000 |

* cited by examiner

*Primary Examiner*—Mike Qi
(74) *Attorney, Agent, or Firm*—McKenna Long & Aldridge LLP

(57) ABSTRACT

A liquid crystal display device and method for fabricating the same is disclosed. The liquid crystal display device includes: first and second substrates; a plurality of gate lines and data lines disposed crossly on the first substrate to define a pixel region; a thin film transistor formed at a cross point of the gate lines and the data lines; a passivation film coated on the entire surface of the first substrate including the thin film transistor; a pixel electrode connected to the thin film transistor, partially overlapping with the neighboring gate lines and the neighboring data lines and formed on the passivation film corresponding to the pixel region; and a black matrix formed on a predetermined area of the second substrate.

24 Claims, 9 Drawing Sheets

LIQUID CRYSTAL DISPLAY AND METHOD FOR FABRICATING THE SAME

This application claims the benefit of the Korean Application No. P2001-87156 filed on Dec. 28, 2001, which is hereby incorporated by reference for all purposes as of fully set forth herein.

BACKGROUND OF THE INVENTION

1. Field of the Invention

The present invention relates to a liquid crystal display device and method for fabricating the same, and more particularly, to a liquid crystal display device and method for fabricating the same adapted to eliminate light leakage failure by forming pixel electrodes to overlap with data lines and gate lines.

2. Discussion of the Related Art

In general, recent developments in the information communication field have increased demand for various types of display devices. In response to this demand, various flat panel type displays, such as liquid crystal display device (LCD), plasma display panel (PDP), electro-luminescent display (ELD), and vacuum fluorescent display (VFD) have been developed, and parts of them are used in various equipment as a display.

In particular, LCD devices have been used as the most popular portable display devices, replacing the cathode ray tube (CRT), because of their high resolution, lightweight, thin profile, and low power consumption characteristics. In addition, LCD devices have been implemented for portable image display devices such as notebook computers. Further, LCD devices have been developed for computer monitors and televisions to receive and display broadcasting signals.

Accordingly, efforts to improve image display quality of LCD devices contrast with the benefits of their high resolution, lightweight, thin profile, and low power consumption. In order to incorporate LCD devices as a general image display, image quality such as fineness, brightness, large-sized area, for example, must be realized.

Such an LCD device includes a liquid crystal panel for image display, and a driving unit for inputting a driving signal to the liquid crystal panel. The liquid crystal panel includes first and second glass substrates attached to each other with a space between the substrates, and a liquid crystal layer injected into the space. The first glass substrate (TFT array substrate) has, on itself, a plurality of gate lines arranged in a direction and spaced by a certain distance from the neighboring gate lines, a plurality of data lines arranged in a direction perpendicular to the direction of the gate lines and spaced apart by a certain distance from the neighboring data lines, a plurality of pixel electrodes arranged in a matrix configuration on the pixel regions defined by the crossing of the gate lines and the data lines, and a plurality of thin film transistors switched by signals of the gate lines and for transferring the signals of the data lines to the respective pixel electrodes. The second glass substrate (color filter substrate) has a black matrix layer for shielding the light of portions other than the pixel regions, a color filter layer of red (R), green (G) and blue (B) for representing colors, and a common electrode for implementing images. In case of an in-plane switching liquid crystal panel that uses horizontal electric field, the common electrode is formed on the first glass substrates. The first and second glass substrates are provided with a space therebetween using a spacer and are attached to each other by a sealant having the liquid crystal injection inlet. The liquid crystal is injected between the two substrates. Liquid crystal displays are currently in use as a TV, a monitor for a PC, a monitor for an aircraft and a personal portable terminal as well as a portable computer, a calculator and a watch. The applications have become various.

A related art liquid crystal display has a backlight device, but there is a problem called light leakage in which the light of the backlight device is leaked to a place other than the panel. The light leakage is caused by a rubbing direction and voltage differences between the pixel electrodes and the gate lines and between the pixel electrodes and the data lines. In other words, the light leakage may occur around the data lines and the gate lines. The light leakage around the data lines is prevented by partially overlapping the data lines and the pixel electrodes. Such a liquid crystal display that enhances the aperture ratio by preventing light leakage from occurring around the data lines is called a high aperture ratio liquid crystal display. Portions around the gate lines of the high aperture ratio liquid crystal display are not overlapped with the pixel electrodes, so that the light leakage occurs around the gate lines.

Hereinafter, the related art liquid crystal display will be described with reference to the accompanying drawings.

Figure 1A:
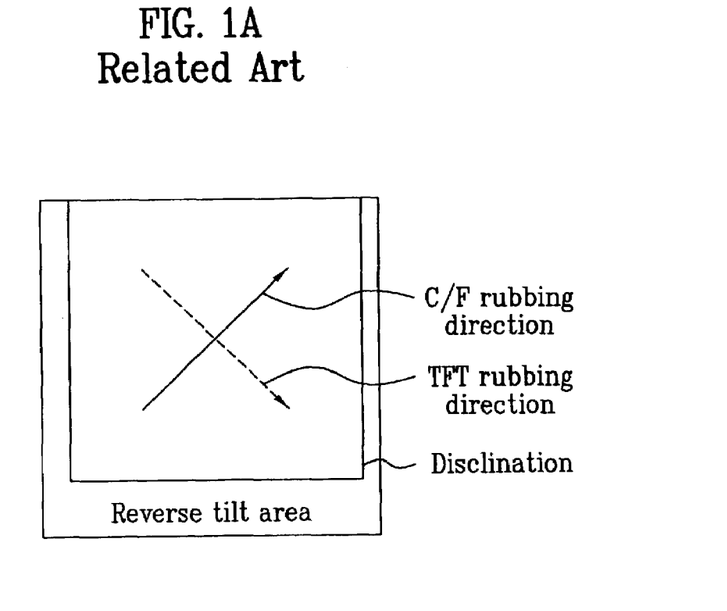
FIGS. 1A and 1B illustrate rubbing directions of the TFT substrate and the C/F substrate of a liquid crystal display device according to the related art.
Figure 1B:
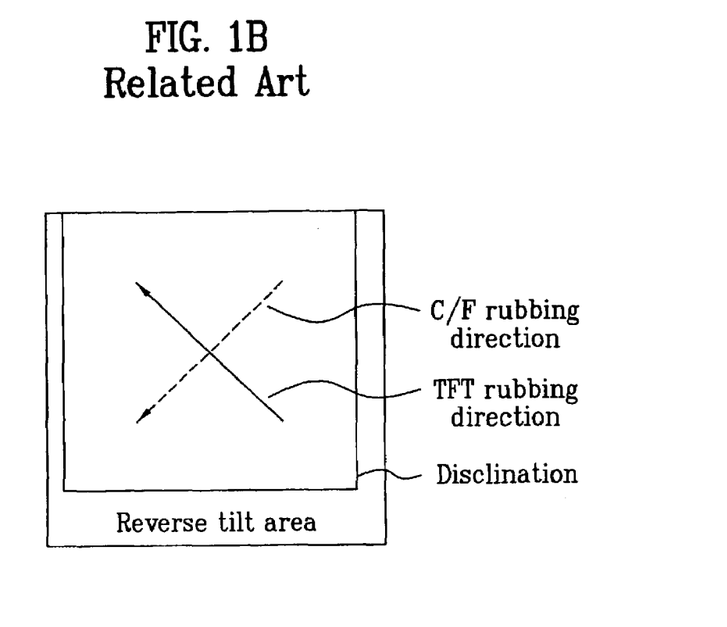

FIGS. 1A and 1B illustrate rubbing directions of the TFT substrate and the color filter (C/F) substrate in the related art liquid crystal display.

As illustrated in FIG. 1A, the TFT substrate has a rubbing direction of approximately 315° and the C/F substrate facing the TFT substrate has a rubbing direction of approximately 45°, which is twisted by −90° from the rubbing direction of the TFT substrate. In this state, even when multi-domains are formed, disclination at a boundary between the domains is generated, so that the light leakage occurs. In addition, a reverse-tilt area is also formed where the tilt angle of the liquid crystal molecules is formed opposite to a desired direction.

Also, as illustrated in FIG. 1B, the TFT substrate has a rubbing direction of approximately 225° and the C/F substrate facing the TFT substrate has a rubbing direction of approximately 135°, which is twisted by 90° from the rubbing direction of the TFT substrate. In this state, even when multi-domains are formed, disclination at the boundary between the domains is generated, so that the light leakage occurs. In addition, a reverse-tilt area is formed where the tilt angle of the liquid crystal molecules is formed opposite to a desired direction.

Figure 2:
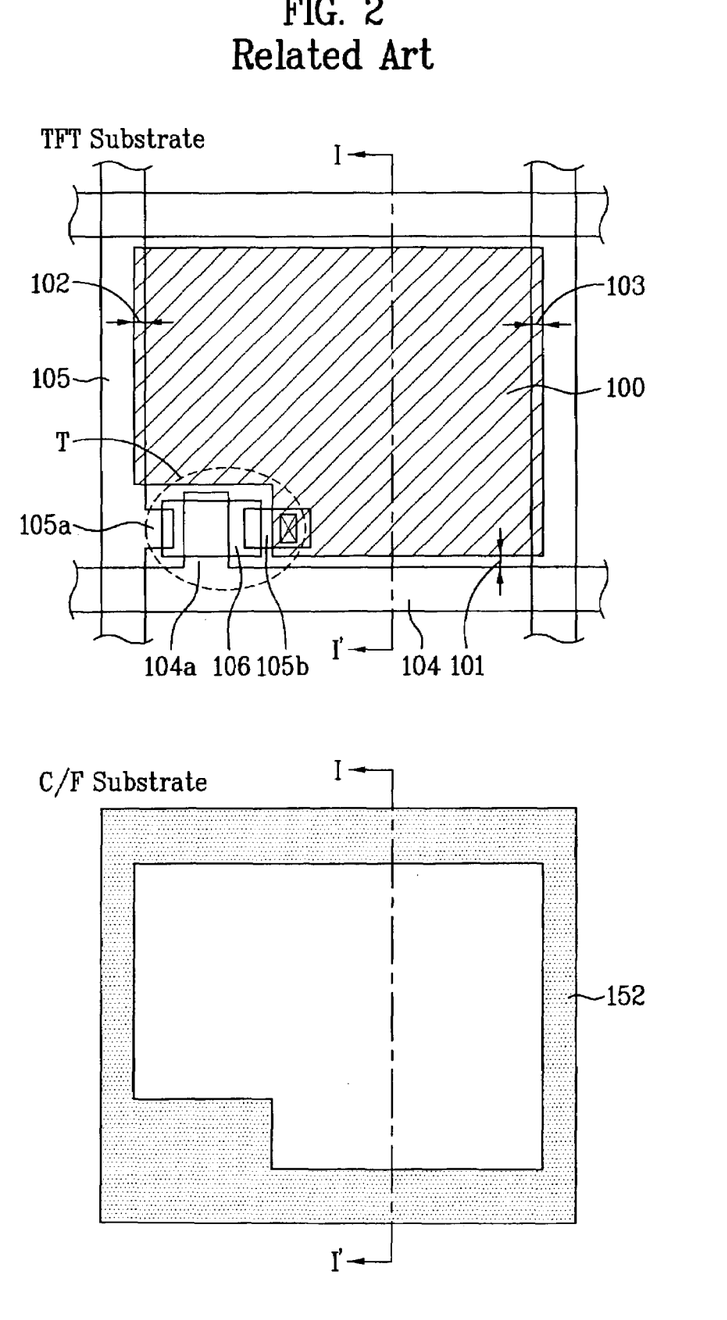
FIG. 2 is plan views of the TFT substrate and the C/F substrate of the liquid crystal display device according to the related art.
Figure 3:
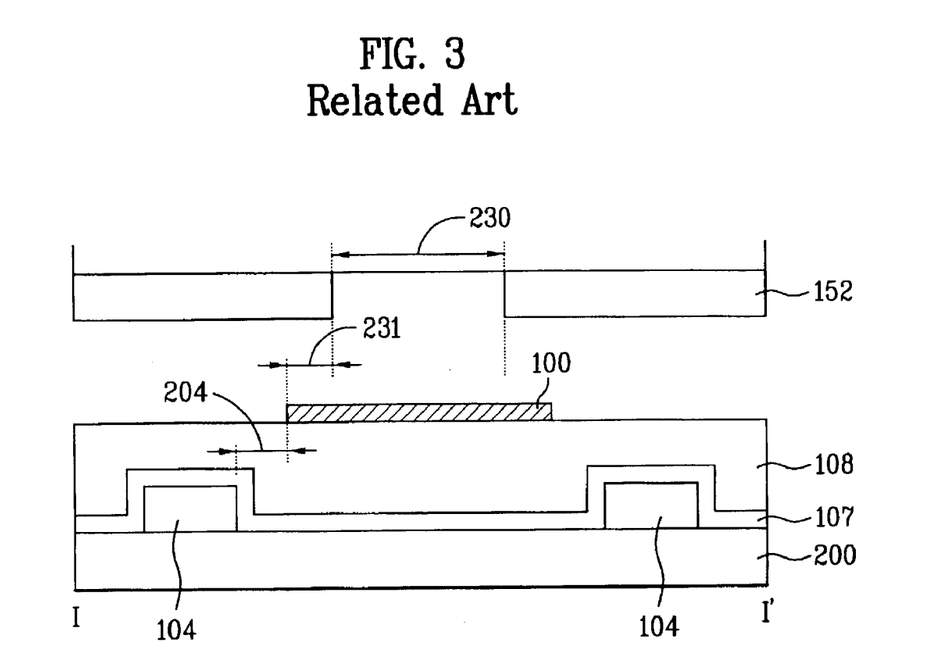
FIG. 3 is a cross sectional view of the liquid crystal display device taken along the line I-I' of FIG. 2.

FIG. 2 is a plan view of the TFT substrate and the C/F substrate of the liquid crystal display according to the related art. FIG. 3 is a cross sectional view of the liquid crystal display, taken along the line I-I' of FIG. 2.

As shown in FIG. 2, the TFT substrate includes gate lines 104 and data lines 105 formed perpendicular to each other to define pixel regions, thin film transistors T at the cross points of the gate lines 104 and the data lines 105, and pixel electrodes 100 connected to thin film transistors 106 and formed on the pixel regions. Some portions 102 and 103 of the pixel electrode 100 are overlapped with the data lines 105, but the pixel electrode is not overlapped with the gate lines 104 and is spaced apart from the gate lines 104 with a predetermined spacing 101.

The thin film transistor T includes a gate electrode 104a projecting from the gate lines 104, a gate insulating film (not shown in FIG. 2) formed on an entire surface including the gate electrode, a semiconductor layer 106 formed on the gate insulating film over the gate electrode 104a, a source electrode 105a projecting from the data lines 105, and a drain electrode 105b facing the source electrode 105a. The drain electrode 105b is electrically connected to the pixel electrode 100 through a contact hole. Some portions 102 and 103 of the pixel electrode 100 that are overlapped with the data lines 105 cover the reverse-tilt areas formed by the rubbing direction and a potential difference between electrodes.

When the rubbing direction of the TFT is approximately 315° and the rubbing direction of the C/F substrate is approximately 45°, the widths 102 and 103 of the pixel electrode 100 that is overlapped with the data lines 105 are 2-4 µm and 0-2 µm, respectively. This is because the reverse-tilted area formed by the shape of the disclination shown in FIG. 1A should be covered. When the rubbing direction of the TFT is approximately 225° and the rubbing direction of the C/F substrate is approximately 135°, the widths 102 and 103 of the pixel electrode 100 overlapping the data lines 105 are 0-2 µm and 2-4 µm, respectively. The reason is that the reverse-tilt area formed by the shape of the disclinations shown in FIG. 1B should be covered.

The gate lines 104 and the pixel electrode 100 are arranged spaced apart by the spacing 101 from each other and thus are not overlapped with each other, so that the light leakage may occur. To this end, the black matrix 152 formed on the C/F substrate facing the TFT substrate is widely formed to cover the thin film transistor T and the gate lines 104 sufficiently, thereby preventing the light leakage. Thus, in order to prevent the light leakage around the gate line 104, the black matrix 152 is widely formed to overlap with a predetermined portion of the pixel electrode 100 including the gate line 104, so that the aperture ratio is decreased.

Meanwhile, referring to FIG. 3, which is a cross sectional view taken along a line I-I' of FIG. 2, gate lines 104 are formed at a constant interval on the TFT substrate 200. On the entire surface of the TFT substrate 200 including the gate lines 104 are sequentially formed a gate insulating film 107 and a passivation film 108 (for example, $SiN_x$). Pixel electrodes 100 are formed on the passivation film 108 between the gate lines 104 and spaced apart by a predetermined interval 204 from the gate lines 104.

Here, since the gate lines 104 are spaced by a constant interval from the pixel electrodes 100, the light leakage may occur. So, the black matrix 152 is formed on the C/F substrate of FIG. 2 so as to overlap with a portion 231 of the pixel electrodes 100 including the gate lines 104.

As a result, the entire opening area 230 is decreased and thus the aperture ratio is reduced. The above-mentioned liquid crystal display has the following problems.

First, the light leakage around the gate line is prevented by overlapping the black matrix formed on the C/F substrate, so that the aperture ratio is reduced.

Second, in order to stably prevent the light leakage from occurring around the gate lines, the black matrix is formed on the C/F substrate so as to overlap with a predetermined portion of the pixel electrodes including the gate lines, so that the production costs are increased due to waste of the black matrix.

SUMMARY OF THE INVENTION

Accordingly, the present invention is directed to a liquid crystal display and method for fabricating the same that substantially obviates one or more problems due to limitations and disadvantages of the related art.

An advantage of the present invention is to provide a liquid crystal display and method for fabricating the same in which the pixel electrode overlaps with the data lines and at the same time the pixel electrode overlaps with the gate lines to reduce the light leakage and thus increase the aperture ratio, thereby improving the display quality.

To achieve these and other advantages and in accordance with the purpose of the invention, as embodied and broadly described herein, a liquid crystal display includes: a first substrate; a second substrate; a plurality of gate lines and data lines disposed to cross each other on the first substrate to define a pixel region; a thin film transistor formed at a cross point of the gate lines and the data lines; a passivation film coated on the entire surface of the first substrate including the thin film transistor; a pixel electrode connected to the thin film transistor, partially overlapping with the neighboring gate lines and the neighboring data lines and formed on the passivation film corresponding to the pixel region; and a black matrix formed on a predetermined area of the second substrate.

Here, the pixel electrode overlaps with the gate line by a length of 2-7 µm and the pixel electrode overlaps with the data line by a length of 0-4 µm. The passivation film is a BCB or an organic insulating film having a low permittivity. The black matrix corresponds to the thin film transistor.

The first substrate has a rubbing direction of 315° and the second substrate has a rubbing or alignment direction of 45°. The rubbing or alignment directions of the first substrate and the second substrate are twisted by −90°.

Alternatively, the first substrate has a rubbing or alignment direction of 255° and the second substrate has a rubbing or alignment direction of 135°. The rubbing directions of the first substrate and the second substrate are twisted by 90°.

The pixel electrode overlapping with the neighboring data lines overlaps with one sided data line by 0-2 µm and with the other sided data line by 2-4 µm.

In another aspect of the present invention, there is provided a method for fabricating a liquid crystal display. The method includes the steps of: preparing a first substrate and a second substrate; forming a plurality of gate lines and data lines disposed crossly on the first substrate to define a pixel region; forming a thin film transistor formed at a cross point of the gate lines and the data lines; forming a passivation film on the entire surface of the first substrate including the thin film transistors; and forming a pixel electrode electrically connected to the thin film transistor, and partially overlapping with the neighboring gate lines and the neighboring data lines The pixel electrode may be formed to overlap with the gate lines by 2-7 µm and with the data lines by 0-4 µm.

The passivation film is a BCB or an organic insulating film having a low permittivity.

Alternatively, the method further includes the step of forming black matrix on a predetermined area of the second substrate corresponding to the thin film transistor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of a liquid crystal display device and a method for forming the same according to the present invention, examples of which are illustrated in the accompanying drawings.

Figure 4:
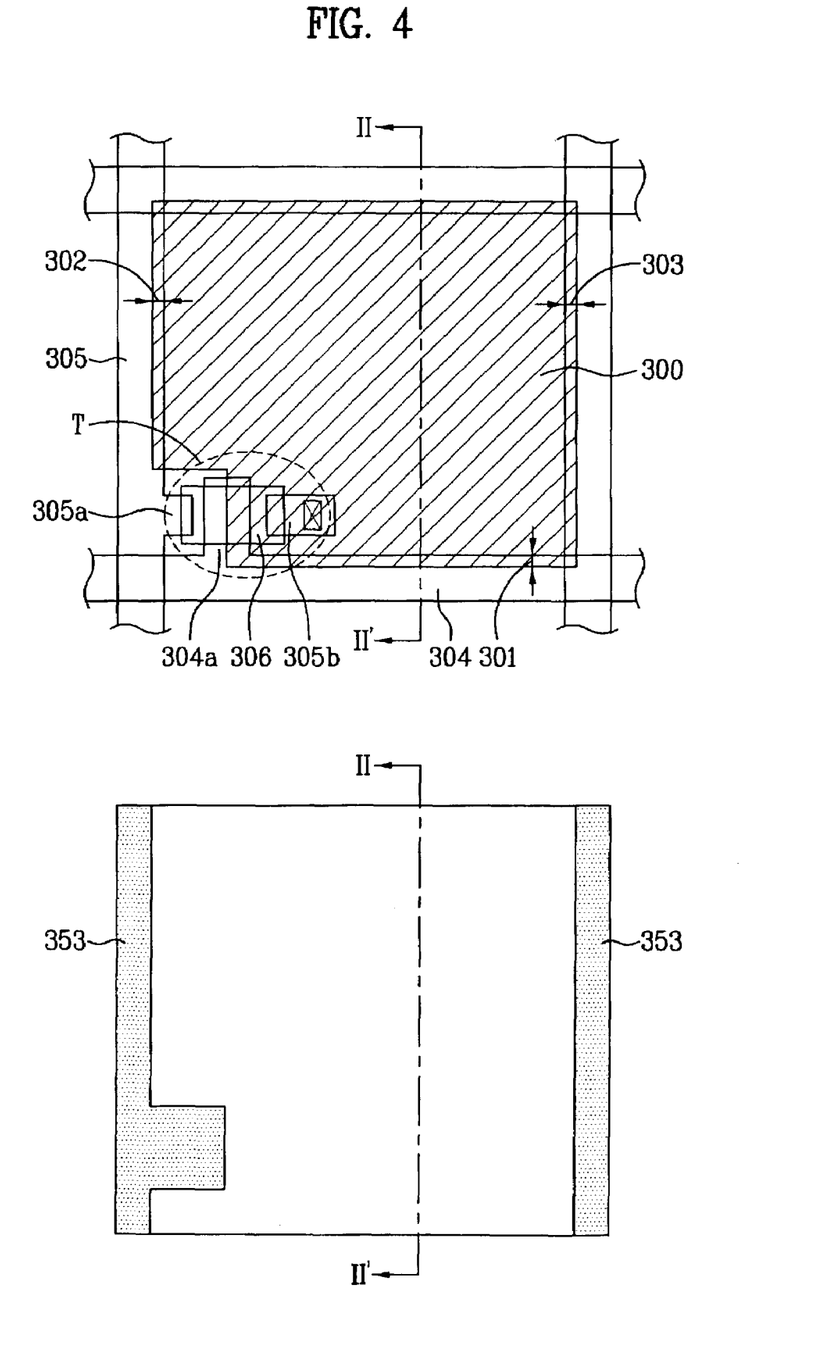
FIG. 4 is plan views of the TFT substrate and the C/F substrate of a liquid crystal display device according to an embodiment the present invention.

FIG. 4 is plan views illustrating a unit pixel region of the thin film transistor (TFT) substrate and a unit pixel region of the color filter (C/F) substrate of a liquid crystal display device according to the present invention.

As illustrated in FIG. 4, in order to define a pixel region on a TFT substrate, a plurality of gate lines 304 are arranged spaced apart by a certain distance from each other in a direction, and a plurality of data lines 305 are arranged spaced apart by a certain distance from each other in a direction substantially perpendicular to the gate lines 304.

Pixel electrodes 300 are formed to overlap with some portions of the neighboring gate lines 304 and data lines 305 in a matrix on the pixel region P defined by the cross of the gate lines 304 and data lines 305. A plurality of thin film transistors T are also formed on the TFT substrate. The thin film transistors are switched by the signals of the gate lines 304 to transfer the signals of the data lines 305 to the pixel electrodes 300.

Each of the thin film transistors T includes a gate electrode 304a projected from the gate line 304, a gate insulating film (not shown) formed on an overall surface of the TFT substrate, a semiconductor layer 306 formed on the gate insulating film (not shown in the drawings) over the gate electrode 304a, a source electrode 305a projected from the data line 305, and a drain electrode 305b formed to face the source electrode 305a. The drain electrode 305b is electrically connected to the pixel electrode 300 through a contact hole.

On the other hand, the TFT substrate configured as mentioned above is attached to a C/F substrate with a space formed therebetween. The C/F substrate includes a black matrix layer 353 having openings each corresponding to each of the pixel regions formed on the TFT substrate, for shielding light, a color filter layer of R, G and B for implementing colors, and a common electrode (not shown in drawings) for driving the liquid crystal display device together with the pixel electrodes 300.

Meanwhile, the black matrix 353 is formed on the area corresponding to the thin film transistor T formed on the TFT substrate.

Here, reference numeral 301 indicates the overlapping width between the gate line 305 and the pixel electrode 300, and reference numerals 302 and 303 indicate the overlapping width between the data lines 305 and the pixel electrode 300.

When the TFT substrate has a rubbing or alignment direction of 315° and the C/F substrate has a rubbing or alignment direction of 45°, which is twisted by −90° from the rubbing or alignment direction of the TFT substrate, the overlapping widths 302 and 303 of the pixel electrode 300 overlapping with the neighboring data lines 305 and used to prevent the light leakage are about 2-4 μm and about 0-2 μm respectively. When the TFT substrate has a rubbing or alignment direction of 255° and the C/F substrate has a rubbing or alignment direction of 135° which is twisted by 90° from the rubbing direction of the TFT substrate, the overlapping widths 302 and 303 of the pixel electrode 300 overlapping with the neighboring data lines 305 and used to prevent the light leakage are about 0-2 μm and about 2-4 μm respectively.

Also, the pixel electrode 300 overlaps with the gate line 304 by about 2-7 μm. This structure of the pixel electrode allows removal of the black matrix 353 for preventing light leakage from occurring around the gate lines 304, so that it is possible to increase the aperture ratio by as much as the black matrix is removed.

Figure 5:
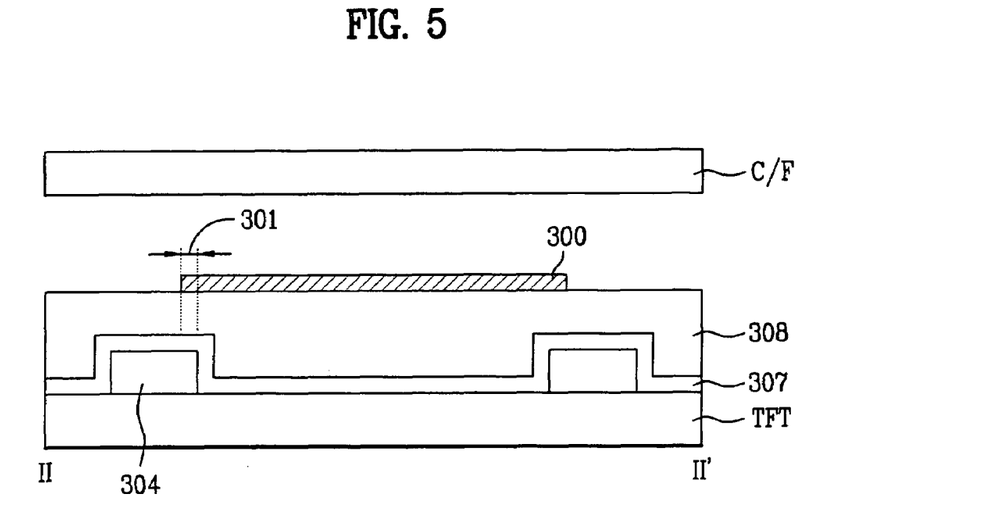
FIG. 5 is a cross sectional view of the liquid crystal display taken along the line II-II' of FIG. 4.

FIG. 5 is a cross sectional view of the liquid crystal display device taken along the line II-II' of FIG. 4.

As illustrated in FIG. 5, gate lines 304 are arranged spaced apart by a certain distance from each other on the TFT substrate. A gate insulating film 307 and a passivation film 308 are formed on the entire surface of the TFT substrate including the gate lines 304. Pixel electrode 300 is formed to partially overlap with the neighboring gate electrodes 304 and data electrodes 305.

The method for forming a liquid crystal display device will be described.

As illustrated in FIG. 5, a conductive metal material such as aluminum (Al), aluminum alloy, molybdenum (Mo), tungsten (W) and chromium (Cr) is deposited on the TFT substrate. The conductive metal material is patterned selectively by a photolithography process and an etching process to form the gate lines spaced apart by a certain distance from each other and the gate electrodes that project from the gate lines 304. Subsequently, an inorganic insulating material such as silicon nitride film ($SiN_x$) and silicon oxide film ($SiO_x$) or an organic insulating material such as benzocyclobutene (BCB) and acryl is deposited to form a gate insulating film 307.

Subsequently, pure amorphous silicon and amorphous silicon containing impurities are deposited on the entire surface of the TFT substrate on which the gate insulating film 307 is formed. The amorphous silicon layer is selectively removed through a photolithography process and an etching process to form a semiconductor layer 306 in an island pattern on the gate insulating film 307 over the gate electrode 304a.

Afterwards, the above-mentioned conductive metal is again deposited on the entire surface of the TFT substrate on which the insulating film 306 is formed. The conductive metal is selectively removed through a photolithography process and an etching process to form data lines 305 substantially perpendicular to the gate lines 304, source electrodes 305a projected from the gate electrodes 304a, and drain electrodes 305b spaced from the source electrodes 305a. An organic insulating material such as benzocyclobutene (BCB) and acryl is coated to form a passivation film 308. The passivation film 308 is selectively removed to form contact holes so that surfaces of the drain electrodes 305b are partially exposed through a photolithography process and an etching process.

Thereafter, a transparent metal layer such as indium tin oxide (ITO) is deposited on the entire surface of the TFT substrate on which the contact holes are formed. The transparent metal layer is selectively removed through a photolithography process and an etching process to form the pixel electrodes 300 which are in contact with the drain electrodes 305b through the contact holes and partially overlap with the neighboring gate lines 304 and data lines 305.

In the meantime, in the present invention, when the pixel electrode 300 overlaps with the gate electrodes 304 and the data electrodes 305, the potential charged on the pixel electrode 300 is coupled with the gate lines 304 and the data lines 305, so that the potentials of the neighboring pixel electrodes become different from each other and thus a spot failure may occur while an image is displayed.

This spot failure can be solved by decreasing the charge capacitances between the data lines 305 and the gate lines 304, between the gate lines 304 and the pixel electrode 300 and between the data lines 305 and the pixel electrodes 300.

Therefore, an organic insulating film (for example, BCB) having a low permittivity may be used as the passivation film 402 between the data lines 305 and the gate lines 304, between the gate lines 304 and the pixel electrode 300 and between the data lines 305 and the pixel electrodes 300 so that the charge capacitance therebetween becomes sufficiently small.

Figure 6A:
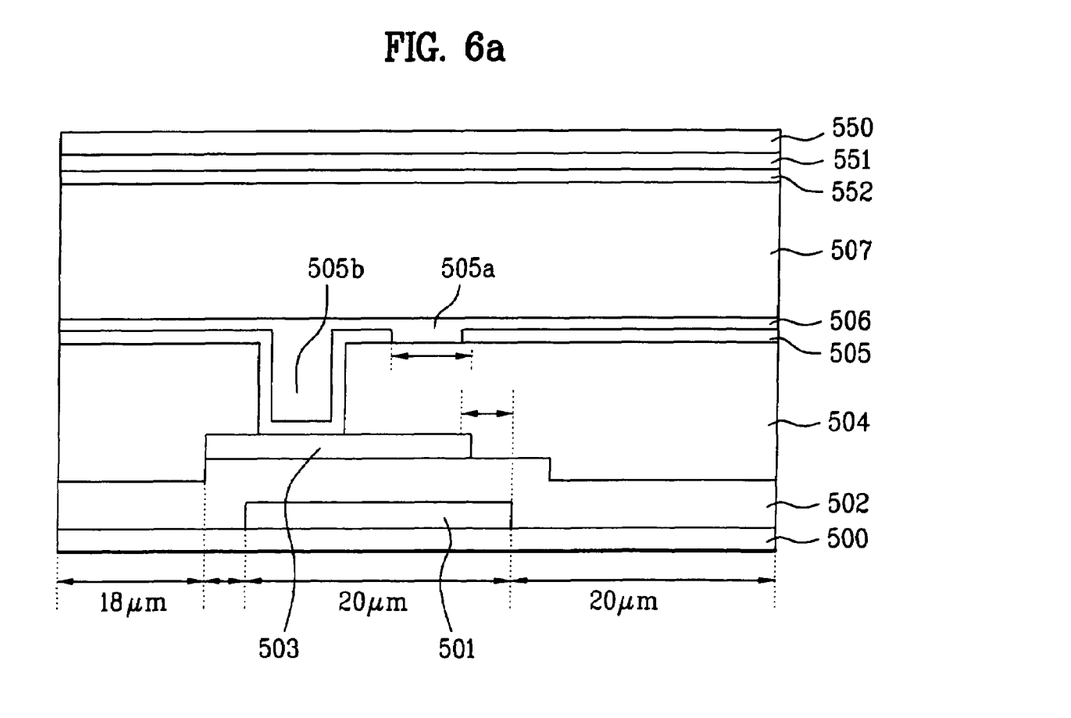
FIGS. 6A through 6D illustrate the results of the computer simulations to optimize the overlapped width between the gate lines and the pixel electrode depending on the rubbing direction in a liquid crystal display device according to the present invention.
Figure 6B:
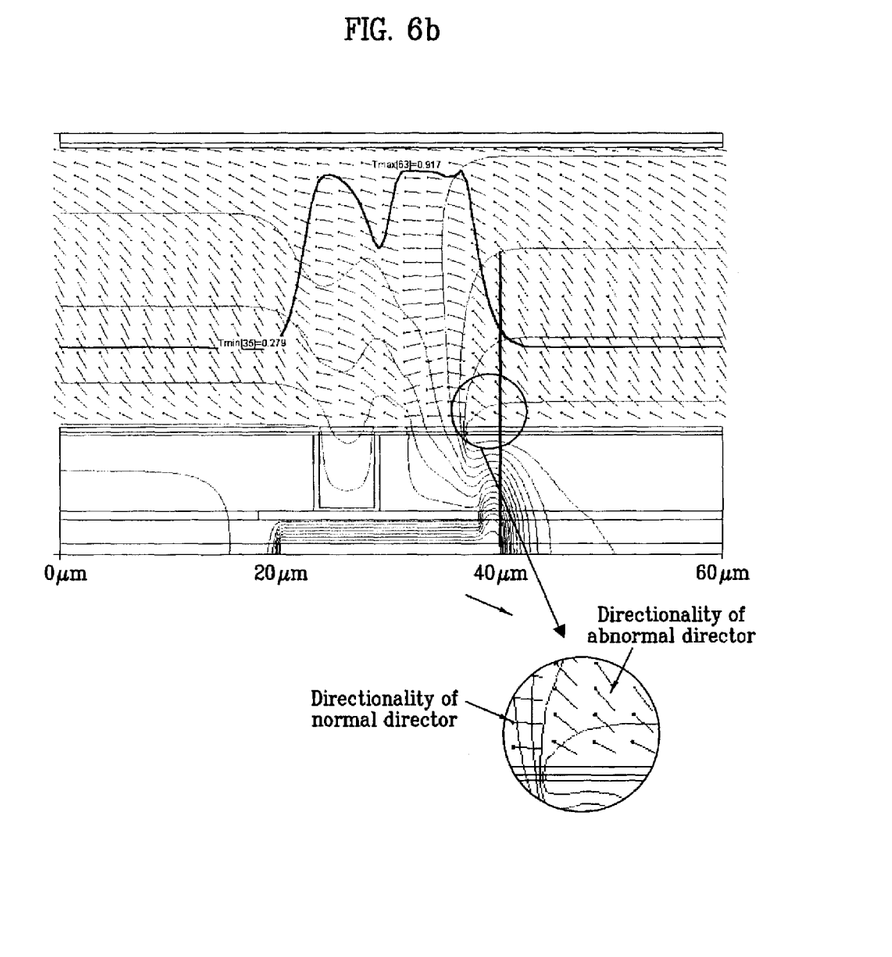

Subsequently, a black matrix is formed on the C/F substrate facing the TFT substrate to prevent light from coming through the thin film transistors FIGS. 6A through 6D illustrate the results of the computer simulations to optimize an overlapping width between the pixel electrode and the gate lines depending on the rubbing direction in a liquid crystal display according to the present invention. Specifically, FIG. 6A illustrates the cross sectional view of the liquid crystal display used in the simulation of the present invention, and FIG. 6B shows behavior of equipotential lines, electric field and liquid crystal for the respective cases occurring as the results of the simulation.

As shown in FIG. 6A, after gate lines 501 are deposited at a thickness of about 0.2 μm on a TFT substrate 500, a gate insulating film 502 having a permittivity of about 6.7 is deposited at a thickness of about 0.4 μm. Subsequently, a storage metal 503 is deposited at a thickness of about 0.15 μm on a selected portion of the gate insulating film 502. BCB 504 having a permittivity of about 2.7 is deposited at a thickness of about 1.3 μm as a passivation film on the entire surface, including over the storage metal 503. Pixel electrodes 505 are formed at a thickness of about 0.05 μm on the BCB 504. The pixel electrode 505 is opened at the position spaced by about 6 μm from an end of the storage metal 503 and connected to the storage metal 503 at an end of the gate line 501 through a contact hole 505b. The pixel electrode 505 overlaps with the gate lines 501 at its end by about 0-7 μm. Polyimide, which is used as a first aligning film and having a permittivity of about 3.4, is coated at a thickness of about 0.08 μm on the entire surface of the pixel electrodes 505. Common electrode 551 is formed at a thickness of about 0.15 μm on C/F substrate 550. Polyimide, which is used as a second aligning film is coated at a thickness of about 0.08 μm on the common electrode 551. Afterwards, the C/F substrate 550 is attached with the TFT substrate 500. A liquid crystal layer is formed between the TFT substrate 500 and the C/F substrate 550.

The conditions applied to the simulation of a liquid crystal display according to the present invention are as follows.

First, LCD master as simulator, 2S, Solver: 2×2.

Second, gate-off, a negative voltage is applied to the $(n-1)^{th}$ pixel electrode from the leftmost, and a positive voltage having the same absolute value as the negative voltage is applied to the $n^{th}$ pixel electrode from the rightmost.

Third, the overlap width of the pixel electrode toward the gate line is increased from about 0 to 7 μm so that the margin for light leakage is determined.

Fourth, during the simulation, on/off gate signals and positive and negative data signals are provided. Specifically, the experiment is executed with the gate-off of serious light leakage. A negative voltage is applied to the left pixel electrode and a positive voltage is applied to the right pixel electrode.

Fifth, since light leakage is not observed at the left pixel (transmittance of about 0.31), the margin of light leakage is determined based on the transmittance of the gate lines that is about 0.31 in case that the transmittance of normal portion is about 0.28 in simulation.

FIG. 6B shows behaviors of equipotential lines, electric field and liquid crystal for the cases as the results of the simulation illustrated in FIG. 6A. As shown in FIG. 6B, normal directors and abnormal directors appear continuously at the position of about 40 μm, and the greatest distortion of the electric field is shown. This result is the case that the pixel electrode overlaps with the gate lines by about 3.5 μm. The transmittance at the gate lines is about 32.4% (at the same time, the transmittance at the normal portion is 27.9%). Table 1 shows the results of 315° rubbing, −90° twisted, 45°, and analyzer 135°.

TABLE 1

<maximum margin of light leakage due to the overlap length between the pixel electrode and the gate lines>

| Overlap (μm) | Transmittance at the end line of gate | Position (μm) where the transmittance is less than 0.31 | Maximum margin (μm) of light leakage |
|---|---|---|---|
| 0 | 0.91 | 44 | 4 |
| 1 | 0.67 | 43 | 3 |
| 2 | 0.46 | 42 | 2 |
| 3 | 0.35 | 41 | 1 |
| 3.5 | 0.32 | 40.5 | 0.5 |
| 4 | 0.31 | 40 | 0 |
| 5 | 0.29 | 39 | −1 |
| 6 | 0.28 | 38 | −2 |
| 7 | 0.28 | 37 | −3 |

Light leakage occurs under the pixel electrodes. If the overlap length between the pixel electrode and the gate lines varies, electric field simply moves horizontally, so that the maximum transmittance around the gate lines varies.

As shown in Table 1, when the overlap length between the pixel electrode and the gate lines is about 4 μm or more, light leakage does not occur. When the overlap length between the pixel electrode and the gate lines is about 5 μm, the transmittance of the pixel electrode is almost the same as those of normal portions. As the overlap length between the gate lines and the pixel electrode is increased, the margin of the light leakage is reduced slightly.

Figure 6C:
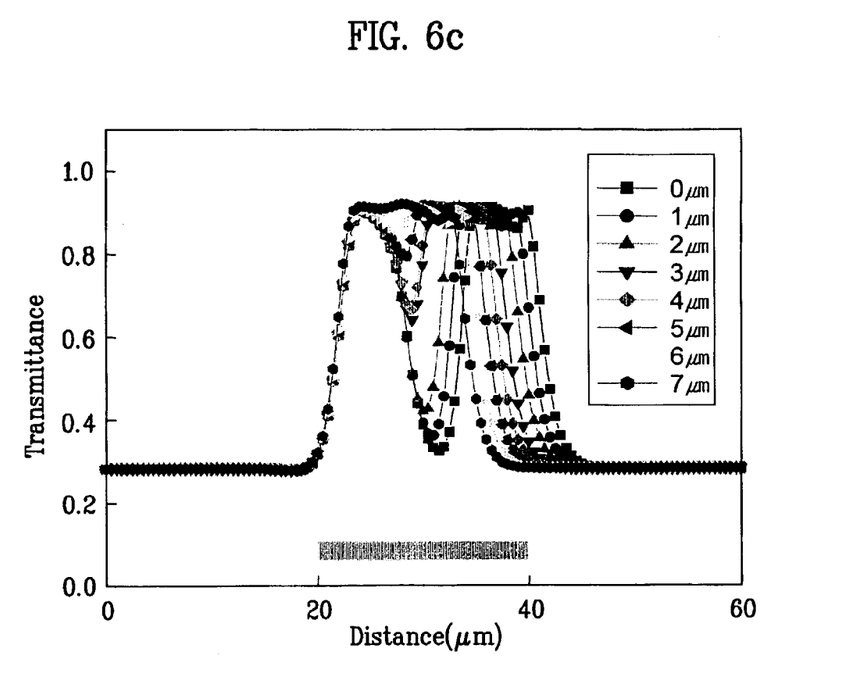
Figure 6D:
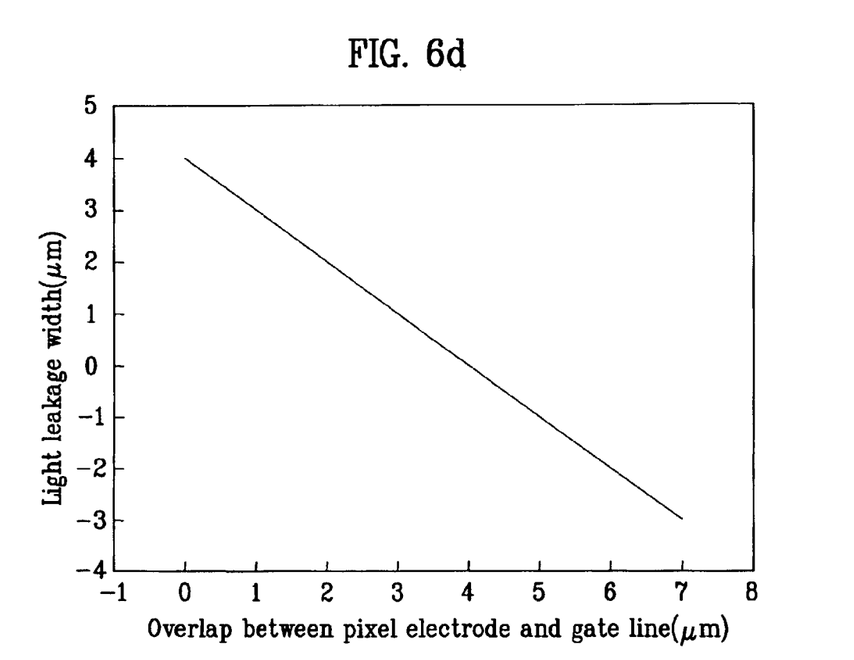

FIGS. 6C and 6D are graphs representing the maximum transmittance according to the variation in the overlap length, position variation on x-axis, and the maximum margin of the light leakage when the position of the end of the gate line is about 40 μm. As shown in FIG. 6D, the transmittance graph shows that the transmittance falls gently to a normal value around an inflection point. Table 2 shows the results of 225° rubbing, 90° twisted, polarizer 135°, and analyzer 45°.

TABLE 2

<maximum margin of light leakage due to the overlap length between the pixel electrode and the gate lines>

| Overlap (μm) | Transmittance at the end line of gate | Position (μm) where the transmittance is less than 0.24 | Maximum margin (μm) of light leakage |
| --- | --- | --- | --- |
| 0 | 0.88 | 43.5 | 3.5 |
| 1 | 0.60 | 43 | 3 |
| 2 | 0.38 | 41.5 | 1.5 |
| 3 | 0.27 | 40.5 | 0.5 |
| 3.5 | 0.24 | 40 | 0 |
| 4 | 0.23 | 39.5 | −0.5 |
| 5 | 0.21 | 39 | −1 |
| 6 | 0.21 | 37.5 | −2.5 |

As shown in Table 2, when the rubbing direction is changed from 315° (twisted by −90°) to 225° (twisted by +90°) and overlap length between the pixel electrode and the gate lines is about 3.5 μm or more, light leakage does not occur. When the overlap length between the pixel electrode and the gate lines is about 5 μm, the transmittance of the pixel electrode is substantially the same as those of normal portions. To determine the margin of light leakage, the position of about 20 μm where the gate lines start is a reference (0.24). As a result, if the transmittance is slightly higher at the position of about 1.5 μm, the margin of the light leakage is reduced slightly, as the overlap length between the gate lines and the pixel electrode is increased.

Accordingly, if main viewing angle is kept at the direction of 6 o'clock, the position of the light leakage of the data lines varies due to the positions of reverse-tilted areas, pixel electrodes, and gate lines like the related art overlap experiment of the data lines, but the gate lines are directed downwards. As a result, the position of the light leakage is influenced by distortion of liquid crystal due to electric field and liquid crystal alignment due to initial rubbing direction.

Figure 7A:
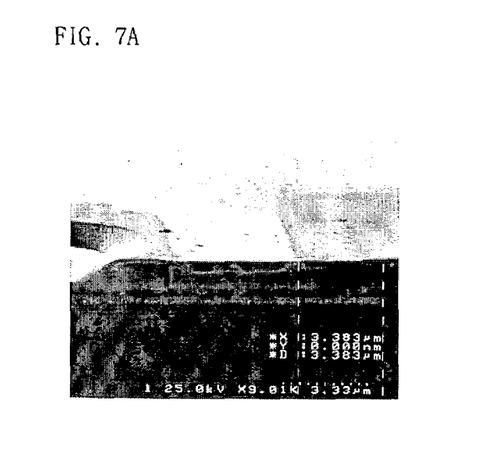
FIGS. 7A through 7F illustrate the experimental results on the overlap between the pixel electrode and the gate lines in the extended graphics array (XGA), e.g., the practical model based on the results of the computer simulations of FIGS. 6A through 6D.
Figure 7B:
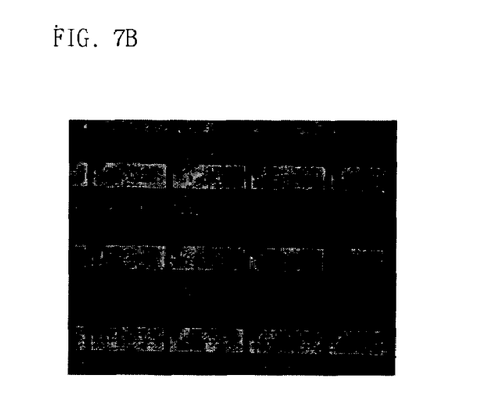
Figure 7C:
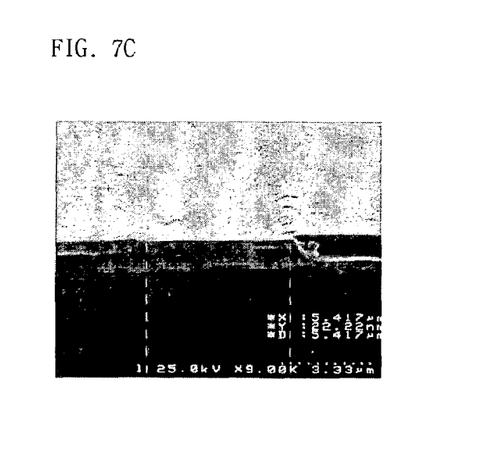
Figure 7D:
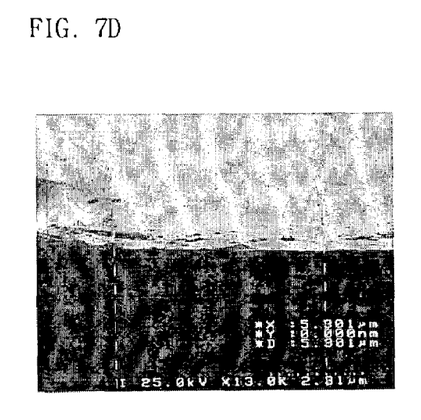
Figure 7E:
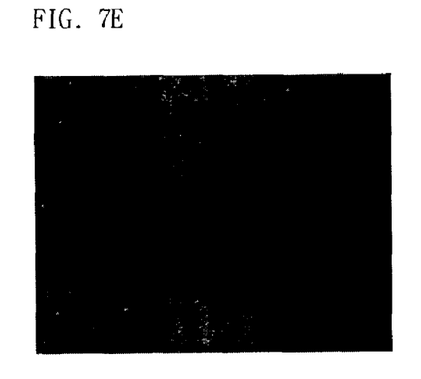
Figure 7F:
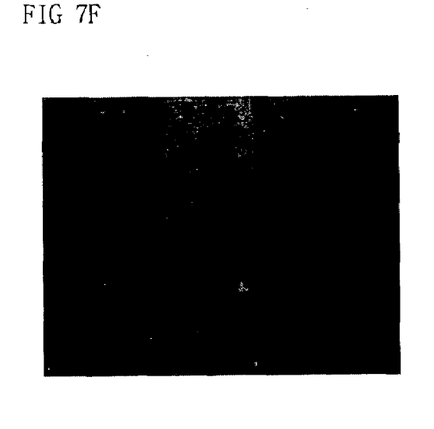

FIGS. 7A through 7F illustrate the results of the experiment in which the pixel electrodes overlap with the gate lines in an extended graphics array (XGA), the practical model based on the results of the computer simulations of FIGS. 6A through 6D. Specifically, FIG. 7A is a SEM photograph showing that the pixel electrode overlaps with the gate lines. FIG. 7B is an LCM driving photograph of the liquid crystal display device of the present invention. FIG. 7C is a SEM photograph showing distance between the pixel electrodes overlapping with the data lines. FIG. 7D is a SEM photograph showing distance between the pixel electrodes overlapping the gate lines. FIG. 7E is an LCM driving photograph showing that an anti-glare processed polarizer (POL) is applied to the liquid crystal display of the present invention. FIG. 7F is an LCM driving photograph showing that a hard coated POL is applied to the liquid crystal display device of the present invention.

FIG. 7A is a SEM picture of when the present invention is applied to XGA class, and the pixel electrode overlaps with the gate lines by about 3.4 μm. As shown in FIG. 7A, the white upper portion within the dotted square represents the portion where the pixel electrode is located. The bottom white dotted line in the lower black portions represents gate lines and the nearest upper white dotted line represents the storage electrodes.

FIG. 7B is an LCM driving photograph of the liquid crystal display of the present invention applied to the XGA class. The light leakage occurs, but a spot is not generated.

FIG. 7C is a SEM photograph showing the pixel electrode overlapping with the data lines in the liquid crystal display device of the present invention applied to XGA class. The distance between the pixel electrodes is designed at 4 μm, but the pixel electrode is over-etched and thus the distance is about 5.4 μm.

FIG. 7D is a SEM photograph showing the pixel electrode overlapping with the data lines in the liquid crystal display device of the present invention applied to the XGA class. The distance between the pixel electrodes is designed at 4 μm, but the pixel electrode is over-etched and thus the distance is about 5.3 μm.

As shown in FIG. 7E, the leaked and thus transmitted light is diffused around the gate lines due to antiglare (AG) processing, so that the light leakage is not recognized. The antiglare processing is to spray silica particles on the surface to roughen the surface and thus provide a low reflection effect. The panel transmitting light is diffused, so that contrast (C/R) is lowered.

Referring to FIG. 7F, since POL is hard-coated, light is easily reflected at surface thereof, so that the light leakage is well recognized. As shown in FIG. 7F, light leakage occurs, but is so weak that viewing angle and C/R are not influenced. The transmittance is increased to 26.14%, LCM brightness is about 210 nits and C/R is increased to about 286. The quality improves. Flicker and cross-talk are maintained at the same level as those in mass production.

As a result, the disclinations around data lines overlap with data lines and pixel electrodes, and the disclinations around gate lines overlap with gate lines and pixel electrodes, thereby preventing the light leakage and obtaining a structure having a superior electro-optical property and an ultra high aperture ratio. Antiglare processing allows the overlap between the pixel electrode and the gate lines to be about 2 μm or more.

The liquid crystal display device and the method according to the present invention have the following effects.

First, the pixel electrodes overlap with gate lines to repair light leakage defect and reduce the width of the black matrix. This makes aperture ratio better to improve the display quality.

Second, the overlap length by which the electrodes overlap the gate lines is changed to reduce the light leakage defect. This lowers the production cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
a first substrate having a first rubbing direction;
a second substrate having a second rubbing direction;

a plurality of gate lines and data lines disposed to cross each other on the first substrate to define a pixel region, the gate line having a gate insulating layer having a first permittivity;

a thin film transistor at a cross point of the gate lines and the data lines;

a storage electrode overlapping a first gate line within the plurality of gate lines;

a passivation film on the entire surface of the first substrate including the thin film transistor, the passivation film having a second permittivity;

a pixel electrode connected to the thin film transistor and connected to the storage electrode, wherein the pixel electrode has a first end that is spaced a first distance from an end of the storage electrode and that overlaps the first gate line, and wherein the pixel electrode has a second end that partially overlaps a second gate line by an at least one gate line overlap and that partially overlaps a neighboring storage electrode overlapping the second gate line, and wherein the pixel electrode overlaps at least one adjacent data line by an at least one data line overlap, and wherein the pixel electrode on the passivation film corresponds to the pixel region; and a black matrix formed on a predetermined area of the second substrate, wherein the first permittivity, the second permittivity, the at least one gate line overlap, and the at least one data line overlap are selected such that the capacitance of the pixel region is substantially minimized and the aperture ratio of the pixel region is substantially maximized, and the at least one gate line overlap is between about 5 µm and 7 µm.

2. The liquid crystal display device according to claim 1, wherein the at least one data line overlap comprises a width of about 0-4 µm.

3. The liquid crystal display device according to claim 1, wherein the passivation film comprises an organic insulating film, and wherein the second permittivity includes a low permittivity.

4. The liquid crystal display device according to claim 1, wherein the passivation film comprises an organic insulating film.

5. The liquid crystal display device according to claim 4, wherein the organic insulating film comprises a BCB.

6. The liquid crystal display device according to claim 1, wherein the black matrix corresponds to the thin film transistor.

7. The liquid crystal display device according to claim 1, wherein the first substrate and the second substrate have a rubbing direction twisted by about −90°.

8. The liquid crystal display device according claim 1, wherein the at least one data line overlap comprises:

a first at least one data line overlap having an overlap width of about 0-2 µm; and a second at least one data line overlap having an overlap width of about 2-4 µm.

9. The liquid crystal display device according to claim 1, wherein the second permittivity comprises a permittivity of about 2.7.

10. The liquid crystal display device according to claim 1, wherein the passivation layer comprises a thickness of about 1.3 µm.

11. The liquid crystal display device according to claim 1, wherein the first permittivity comprises a permittivity of about 6.7

12. The liquid crystal display device according to claim 1, wherein the gate insulating layer comprises a thickness of about 0.4 µm.

13. A method for forming a liquid crystal display device, comprising:

preparing a first substrate having a first rubbing direction;

preparing a second substrate having a second rubbing direction;

forming a plurality of gate lines and data lines disposed to cross each other on the first substrate to define a pixel region;

forming a gate insulating layer on the gate lines having a first permittivity;

forming a thin film transistor at a cross point of the gate lines and the data lines;

forming a storage electrode overlapping a first gate line within the plurality of gate lines;

forming a passivation film on the entire surface of the first substrate, including the thin film transistor, the passivation film having a second permittivity; and forming a pixel electrode electrically connected to the thin film transistor and connected to the storage electrode, wherein the pixel electrode has a first end that is spaced a first distance from an end of the storage electrode and that overlaps the first gate line, and wherein the pixel electrode has a second end that partially overlaps a second gate line by an at least one gate line overlap and that partially overlaps a neighboring storage electrode overlapping the second gate line and wherein the pixel electrode overlaps at least one data line within the plurality of lines by an at least one data line overlap, wherein the first permittivity, the second permittivity, the at least one gate line overlap, and the at least one data line overlap are selected such that the capacitance of the pixel region is substantially minimized and the aperture ratio of the pixel region is substantially maximized, and the at least one gate line overlap is between about 5 µm to about 7 µm.

14. The method according to claim 13, wherein the data line overlap comprises a width of about 0-4 µm.

15. The method according to claim 13, wherein the passivation film comprises an organic insulating film, and wherein the second permittivity includes a low permittivity.

16. The method according to claim 15, wherein the organic insulating film comprises a BCB.

17. The method according to claim 13, further comprising the step of forming a black matrix on a predetermined area of the second substrate corresponding to the thin film transistor.

18. The method according to claim 13, further comprising providing an alignment layer on one of the first substrate and the second substrate.

19. The method according to claim 18, further comprising providing an alignment layer on the other of the first substrate and second substrate.

20. The liquid crystal display device according to claim 13, wherein the second permittivity comprises a permittivity of about 2.7.

21. The liquid crystal display device according to claim 13, wherein the passivation layer comprises a thickness of about 1.3 µm.

22. The liquid crystal display device according to claim 13, wherein the first permittivity comprises a permittivity of about 6.7.

23. A liquid crystal display device comprising:

a first substrate having a first rubbing direction;

a second substrate having a second rubbing direction;

a plurality of gate lines and data lines disposed to cross each other on the first substrate to define a pixel region, the gate line having a gate insulating layer having a first permittivity;

a thin film transistor at a cross point of the gate lines and the data lines;

a storage electrode overlapping a first gate line within the plurality of gate lines;

a passivation film on the entire surface of the first substrate including the thin film transistor, the passivation film having a second permittivity;

a pixel electrode connected to the thin film transistor and connected to the storage electrode, wherein the pixel electrode has a first end that is spaced a first distance from an end of the storage electrode and that overlaps the first gate line, and wherein the pixel electrode has a second end that partially overlaps a second gate line by an at least one gate line overlap, and wherein the pixel electrode overlaps at least one adjacent data line by an at least one data line overlap, and wherein the pixel electrode on the passivation film corresponds to the pixel region; and a black matrix formed on a predetermined area of the second substrate, wherein the first permittivity, the second permittivity, the at least one gate line overlap, and the at least one data line overlap are selected such that the capacitance of the pixel region is substantially minimized and the aperture ratio of the pixel region is substantially maximized, and the at least one gate line overlap is between about 4 μm and 7 μm, and wherein the first distance is about 6 μm.

24. A method for forming a liquid crystal display device, comprising:

preparing a first substrate having a first rubbing direction;

preparing a second substrate having a second rubbing direction;

forming a plurality of gate lines and data lines disposed to cross each other on the first substrate to define a pixel region;

forming a gate insulating layer on the gate lines having a first permittivity;

forming a thin film transistor at a cross point of the gate lines and the data lines;

forming a storage electrode overlapping a first gate line within the plurality of gate lines;

forming a passivation film on the entire surface of the first substrate, including the thin film transistor, the passivation film having a second permittivity; and forming a pixel electrode electrically connected to the thin film transistor and connected to the storage electrode, wherein the pixel electrode has a first end that is spaced a first distance from an end of the storage electrode and that overlaps the first gate line, and wherein the pixel electrode has a second end that partially overlaps a second gate line by an at least one gate line overlap, and wherein the pixel electrode overlaps at least one data line within the plurality of lines by an at least one data line overlap, wherein the first permittivity, the second permittivity, the at least one gate line overlap, and the at least one data line overlap are selected such that the capacitance of the pixel region is substantially minimized and the aperture ratio of the pixel region is substantially maximized, and the at least one gate line overlap is between about 3.5 μm to about 7 μm, and wherein the first distance is about 6 μm.

* * * * *